S. LIBERTO.
ATTACHMENT FOR COFFEE ROASTERS.
APPLICATION FILED SEPT. 12, 1917.
1,256,336.
Patented Feb. 12, 1918.
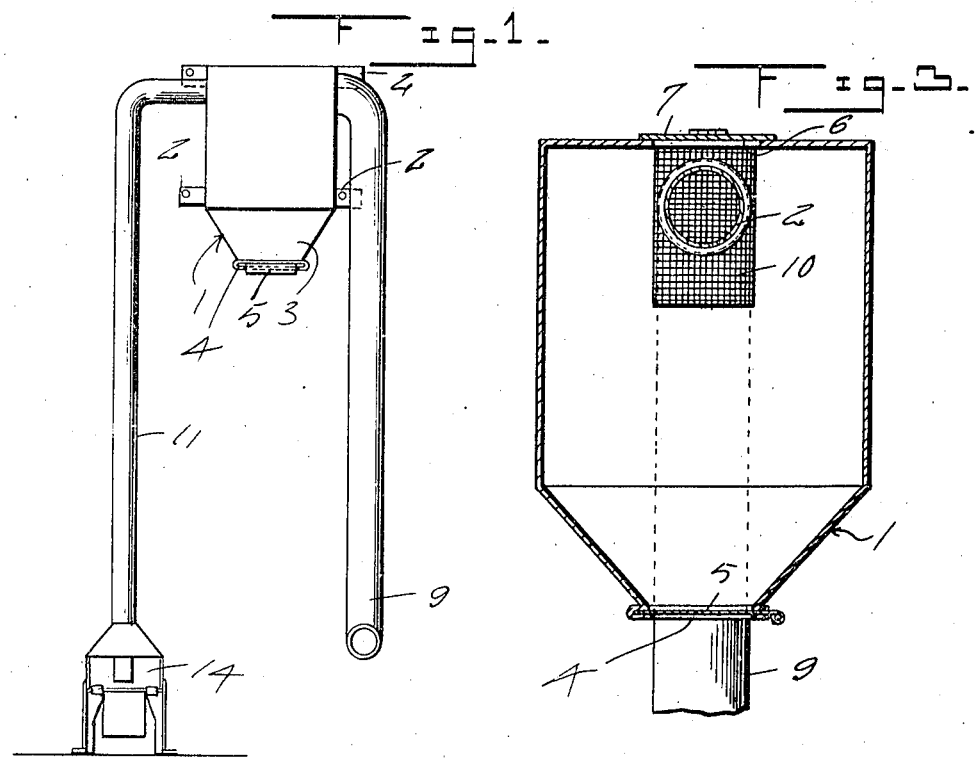
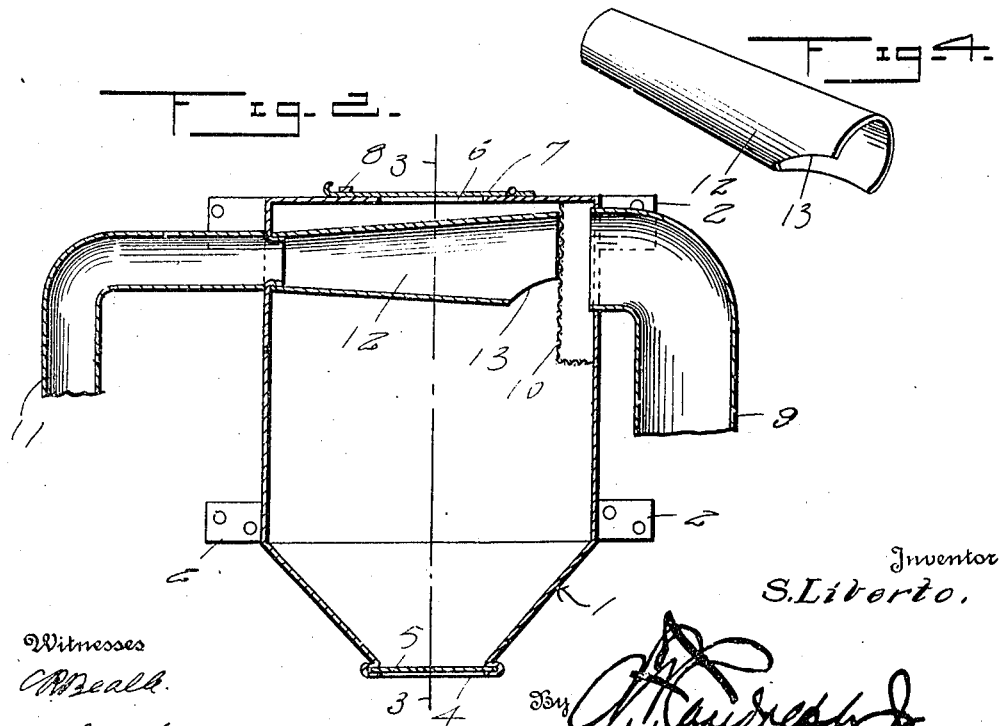

UNITED STATES PATENT OFFICE.

SAMUEL LIBERTO, OF SAN ANTONIO, TEXAS.

ATTACHMENT FOR COFFEE-ROASTERS.

1,256,336.   Specification of Letters Patent.   Patented Feb. 12, 1918.

Original application filed July 28, 1916, Serial No. 111,857. Divided and this application filed September 12, 1917. Serial No. 191,086.

*To all whom it may concern:*

Be it known that I, SAMUEL LIBERTO, a citizen of the United States, residing at San Antonio, in the county of Bexar and State of Texas, have invented certain new and useful Improvements in Attachments for Coffee-Roasters; and I do hereby declare the following to be a full, clear, and exact description of the invention, such as will enable others skilled in the art to which it appertains to make and use the same.

This invention relates to improvements in an attachment for coffee roasters being a division of my application filed July 28, 1916, serially numbered 111,857, and its primary object is the provision of a device of this kind for storing coffee after it has been separated from foreign matter heavier than the coffee by a separator described and claimed in my co-pending application.

Another object of this invention is the provision of a hopper or receptacle having a screen therein adapted to prevent the coffee from passing into the suction pipe and which causes it to fall into the hopper.

A still further object of this invention is the provision of an attachment for coffee roasters, of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a front elevation of an attachment for coffee roasters constructed in accordance with my invention.

Fig. 2 is a vertical sectional view illustrating the means of separating the coffee from foreign matter.

Fig. 3 is a transverse sectional view taken on the line 3—3 Fig. 2.

Fig. 4 is a perspective view of a distributing pipe.

Referring in detail to the drawing, the numeral 1 indicates as an entirety a storage hopper having secured to the rear wall thereof, brackets 2 for attaching the same to the wall of a building. The lower end of the hopper 1 is reduced as shown at 3 and has an opening or outlet port 4, which is closed by a sliding door 5, so that the contents of the hopper may be removed therefrom when desired. The top wall of the hopper is provided with a door way 6, which is normally closed by a hinged door 7. The hinged door 7 is held in a closed position by a catch 8. The door 7 is for the purpose of permitting a person to gain access to the interior of the hopper when desired.

A suction pipe 9 is secured to the upper end of the hopper 1 and is connected in any suitable manner with a suction fan, which may be employed upon a coffee roasting machine or a fan especially adapted for creating a suction in the suction pipe 9. A wire cage 10 is secured within the hopper 1 and overlies the end of the suction pipe 9 as clearly shown in Fig. 2 for the purpose of preventing coffee from passing into the suction pipe as it is drawn into the hopper and which will be hereinafter more fully described.

An inlet pipe 11 is secured to the hopper 1 at a point opposite the suction pipe 9 and has mounted thereon and positioned within the hopper 1, a distributing pipe 12, which increases in dimension toward the wire cage 10 and is cut away to form an opening 13 for allowing coffee drawn up through the pipe 11 to pass into the hopper by way of the pipe 12 and the opening 10 under the influence of the suction fan, which is adapted to be connected to the suction pipe 9.

A receiving hopper 14 of the type described and claimed in my copending application is connected to the lower end of the supply pipe 11 and is adapted to receive coffee after being roasted.

After the coffee has been roasted in the usual manner, it contains considerable foreign matter, such as, stones, nails, etc., and in order to separate this foreign matter from the coffee, the coffee is placed within the receiving hopper 14 and is drawn therefrom by the suction created through the suction pipe 9 upwardly through the pipe 11 into the storage hopper permitting the foreign matter that is heavier than the coffee to be collected in the receiving hopper. As the coffee passes out of the pipe 11 into the distributing pipe 12, it strikes against the wire cage 10 and is deflected in the storage hopper. The coffee being larger than the mesh of the wire cage 10 passes downwardly through the opening or cut away portion 13 of the distributing pipe 12 and falls into the receiving hopper, whence it may be dispensed therefrom by way of the outlet port 4 by opening the door 5.

While I have shown and described the preferred embodiment of my invention, it will be understood that minor changes in construction, combination and arrangement of parts may be made without departing from the spirit and scope of the invention as claimed.

Having thus described my invention, what I claim is:

A device of the character set forth comprising a storage hopper, an inlet pipe connected to said hopper, a suction pipe connected to said hopper, a screen cage located in said hopper over the suction pipe, and a distributing pipe connected to the inlet pipe within the hopper and having a cut away portion in its free end disposed adjacent the cage for permitting coffee to fall downwardly in the hopper when abutting the cage.

In testimony whereof I affix my signature in presence of two witnesses.

SAMUEL LIBERTO.

Witnesses:
J. S. MAIDA,
V. RINANDO.

Copies of this patent may be obtained for five cents each, by addressing the "Commissioner of Patents, Washington, D. C."